Nov. 15, 1960 N. B. REHNQVIST 2,960,215
WIRE-DRAWING MACHINES
Filed March 19, 1958 3 Sheets-Sheet 1
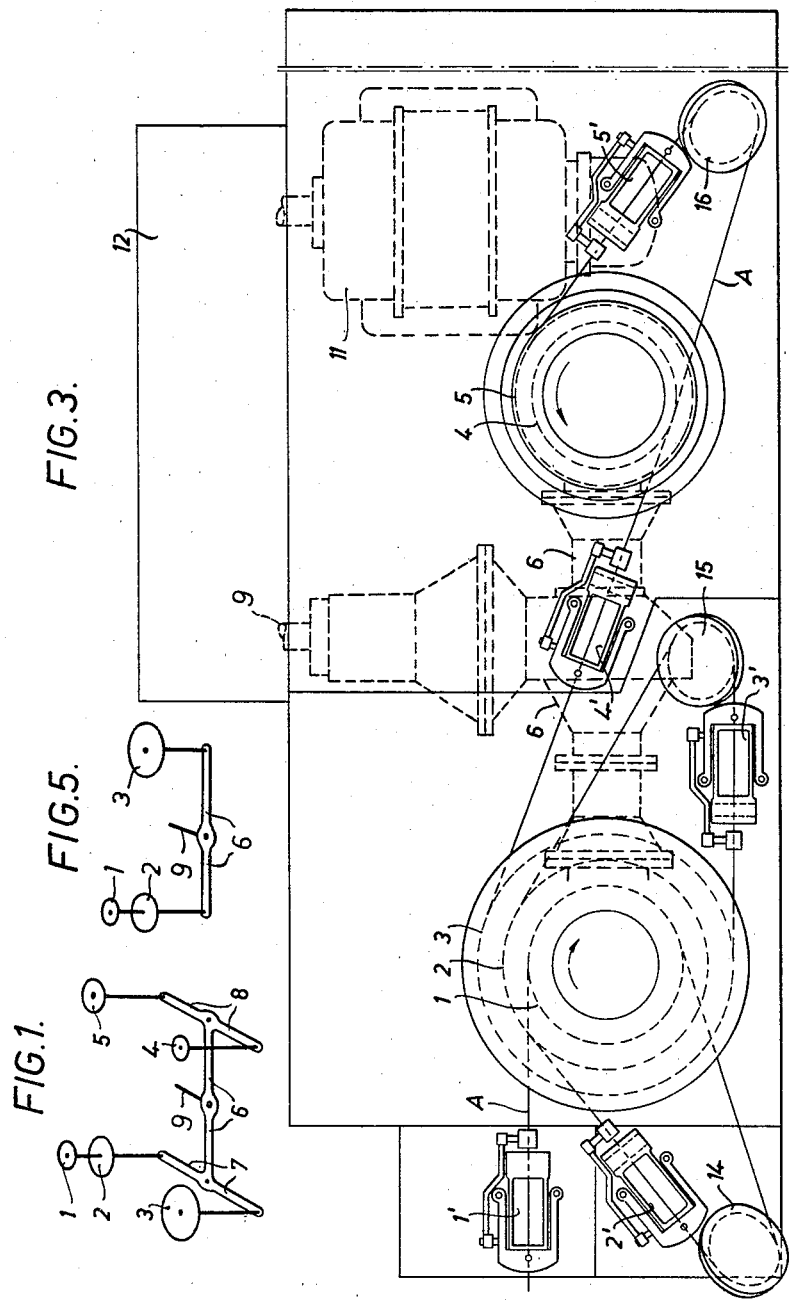
Inventor
N.B. Rehnqvist
By Glascock Downing Seebold
Attys.

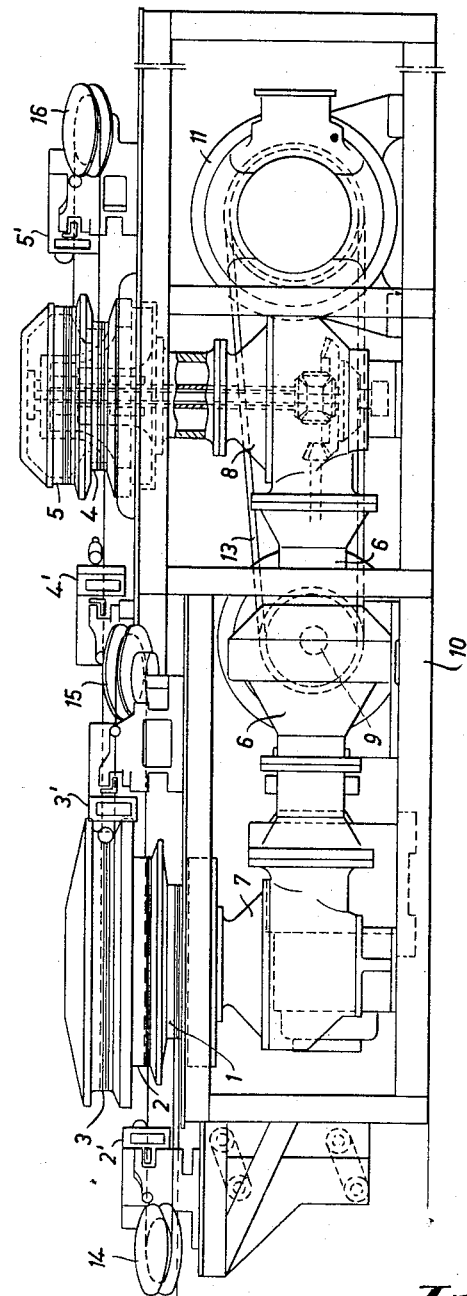

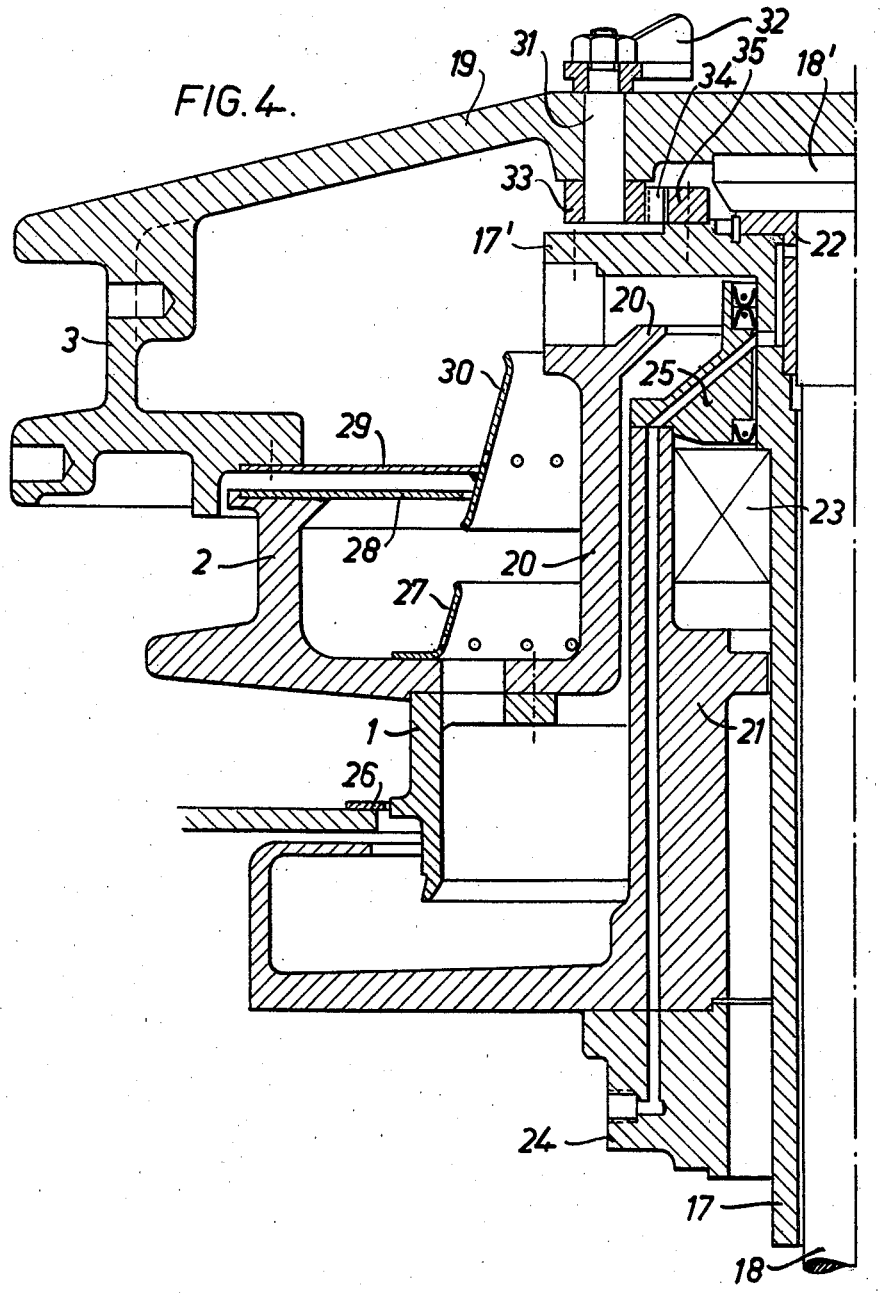

United States Patent Office 2,960,215
Patented Nov. 15, 1960

2,960,215
WIRE-DRAWING MACHINES

Nils Bernhard Rehnqvist, Tegelslagaregatan 3, Kristinehamn, Sweden

Filed Mar. 19, 1958, Ser. No. 722,508

Claims priority, application Sweden Nov. 16, 1957

4 Claims. (Cl. 205—13)

This invention relates to a wire-drawing machine of a differential gear type, in which one of the two output shafts of at least one differential gear is provided for driving a number of drawing drums or blocks at the wire-entrance side of the machine, while the other output shaft of said differential gear is provided for driving a number of drawing drums at the take-up side of the machine.

In wire-drawing machines of the differential gear type, comprising four drawing stages, viz. four drawing drums and four associated drawing dies, there may be provided, according to well-known practice, two further differential gears on a respective one of the two output shafts of the first-mentioned differential gear. Then, the two output shafts of the second differential gear may be provided for driving the drawing drums at the entrance side of the machine, while the two output shafts of the third differential gears are provided for driving the drawing drums at the take-up side of the machine. The two output shafts of each of said further differential gears may be disposed concentrically, one within the other, also the associated drums being coaxial, as disclosed by my Swedish Patent No. 125,667 issued June 2, 1949, as well as my corresponding German Patent No. 916,523 and French Patent No. 971,037.

In wire-drawing machines having a series of epicyclic gear trains or differential gears for driving the drawing drums it is a general practice to brake the drawing drums or their shafts for subjecting the wire to a "back-pull" or a "back-tension" acting in a direction opposite to the direction of drawing, prior to the entrance of the wire in each succeeding drawing stage. The production of this "back-tension," or "counter-pull" or "counter-drawing" as it is also termed, by means of a braking force has evidently the disadvantage of causing power losses which are unnecessary per se. According to another well-known proposal a similar action can be produced by decreasing the degree of reduction in each individual succeeding drawing stage, but this would mean that the drawing capacity of the machine is not fully utilized.

According to one aspect of the present invention the object of the same is to create an improved wire-drawing machine of the differential gear type in which the "back-tension" desired can be produced without power losses, viz. without braking, and under utilizing the machine to a high degree of the reduction attainable.

The main feature of the present improved wire-drawing machine refers to the provision of at least one differential gear so as to drive a greater number of drawing drums on one side than on the other, said greater number comprising the first, the second and the third drawing drums or the first and the second drawing drums, whereby said differential gear is more heavily loaded on one side than on the other. Thus, according to the invention an especial kind of asymmetrical loading of the differential gear is utilized, consisting therein that the number of drawing stages is asymmetrically distributed with respect to the differential gear, for loading this gear more heavily on the entrance side and thereby subjecting the wire to the "back-tension" required.

A preferred embodiment of a wire-drawing machine according to the invention comprises three drawing stages or drums at the entrance side and two drawing stages or drums at the take-up side of the machine. A first differential gear is provided for driving both a second differential gear and a third differential gear in well-known manner. The second and the third drawing drums at the entrance side are driven by a respective one of the two output shafts of the second differential gear. The first drawing drum is firmly connected with the second drawing drum, these two drums being jointly operated by the associated shaft. The fourth and fifth drawing drums at the take-up side of the machine are driven by a respective one of the two output shafts of the third differential gear.

Thus, in the embodiment set forth above the first differential gear is, via the second differential gear, loaded by three drawing stages at the entrance side of the machine, but via the third differential gear loaded only by two drawing stages at the take-up side of the machine. The second differential gear is loaded by two drawing stages at one end and only by one drawing stage at the other end. The third differential gear is not loaded by any additional drawing stage at one end, but this is not necessary because the degree of reduction in the fifth drawing stage is always smaller than in the preceding fourth drawing stage, so that the third differential gear is more heavily loaded by the fourth drawing stage than by the fifth drawing stage.

It should be understood that all differential gears are asymmetrically loaded in one and the same predetermined direction, viz. in the direction in which the wire runs through the associated drawing stages, and it is an important feature that this asymmetrical loading of at least the differential gears driving the first ones of the drawing stages is effected by a greater number of drawing stages on the entrance side of the respective differential gear for subjecting the wire to a "back-tension" before entering the succeeding drawing stage, so that the degree of reduction in each drawing stage of a major number of the total drawing stages can be selected properly only with respect to the reduction series and without any power-consuming braking.

According to another aspect of the invention the object of the same is to create an improved method of drawing wire in a wire-drawing machine of the differential gear type and comprising five drawing stages as set forth above, wherein the wire is drawn through all of the dies for loading the first differential gear more heavily on one side by the first, second and third dies than on the other side by the fourth and fifth dies and loading said second differential gear more heavily on one side by the first and second dies than on the other side by the third die.

A further object of the invention is to create an improved method of drawing wire in a wire-drawing machine of the differential gear type, built with five drawing stages as set forth above, for rendering it possible to use the very same machine for a reduced number of passes while still maintaining the particular asymmetrical loading by a greater number of drawing stages on the entrance side.

Such improved method is characterized by drawing the wire only through the second, third and fourth dies for loading the first differential gear more heavily on one side by the second and the third dies than on the other side by the fourth die, the fifth drum being used only for take-up.

These as well as further objects and features of the invention will be apparent from the following description when read in conjunction with the accompanying drawings, in which:

Fig. 1 is a diagrammatic perspective view illustrating the principal arrangement of a wire-drawing machine comprising five drawing stages according to a preferred embodiment of the invention;

Fig. 2 is an elevation of a practical embodiment of a wire-drawing machine based on the principal arrangement of Fig. 1 but modified such that the two output shafts of each of the second and the third differential gears extend concentrically and upwards;

Fig. 3 is a plan of the practical embodiment of the wire-drawing machine according to Fig. 2, illustrating especially the location of the five drawing stages and the course of the wire through the machine;

Fig. 4 shows, on a greater scale, a fractional vertical cross-section through the first three drawing drums which are co-axial, said cross-section being taken on the common center axis of said drums;

Fig. 5 is a diagrammatic perspective view illustrating the principal arrangement of a wire-drawing machine built with three drawing stages according to an alternative embodiment of the invention.

In Fig. 1 of the drawing, the drawing drums of each drawing stage are designated by the reference numerals 1, 2, 3, 4 and 5 in the same consecutive order as the wire passes around the same in its course through the machine. The two output shafts of the first differential gear 6 are provided for driving the second differential gear 7 and the third differential gear 8, respectively. The first differential gear 6 extends in the longitudinal direction of the machine and has its driving shaft 9 extending transversally.

One of the two output shafts of the second differential gear 7 is provided for driving both the first drawing drum 1 and the second drawing drum 2 which are coaxial and firmly interconnected. The other output shaft of the second differential gear 7 is provided for driving the third drawing drum 3. The two output shafts of the third differential gear 8 are provided for driving a respective one of the fourth drawing drum 4 and the fifth drawing drum 5. The first three drawing drums 1, 2, 3 disposed at the side of the machine where the wire is entered into the first drawing stage, are carried out with stage-wise increasing diameters. Also the last two drawing drums 4 and 5 disposed at the take-up side of the machine are carried out with stage-wise increasing diameters.

On account of the asymmetrical arrangement of the number of drawing stages with respect to the first differential gear 6 and the second differential gear 7 as described above, the first differential gear 6 is more heavily loaded on the entrance side of the machine by the first, second and third drawing stages 1, 2, 3 than on the take-up side of the machine by the fourth and fifth drawing stages 4 and 5, and the second differential gear 7 is more heavily loaded by the first and second drawing stages 1 and 2 at the entrance end than by the third drawing stage 3 at the other end. Thereby, a "back-tension" is created in the wire before entering a succeeding stage, while maintaining the proper degrees of reduction in the individual drawing stages, without any braking of the driving shafts or drums.

A machine construction in its general arrangement is illustrated in Figs. 2 and 3, in which the drawing drums are indicated by 1, 2, 3, 4, 5, as in Fig. 1, and the associated drawing dies are indicated by 1', 2', 3', 4', 5', respectively, while the course or path of the wire is indicated by A.

In the frame 10 of the machine is the prime mover or motor 11 mounted, which through a gear box 12 together with a belt transmission 13 drives the input shaft 9 of the first differential gear 6. One output shaft of the first differential gear 6 constitutes the input shaft of the second differential gear 7, and the other output shaft of the first differential gear 6 constitutes the input shaft of the third differential gear 8. The two output shafts of the second differential 7 gear are coaxial and both directed upwards, disposed concentrically, one within the other, and supporting and driving the three coaxial drawing drums 1, 2, 3, as more clearly illustrated in Fig. 4. The two output shafts of the third differential gear 8 are also concentric, supporting and driving the two coaxial drawing drums 4, 5, as indicated in Fig. 2. The coaxial arrangement of two drawing drums and the operation of the same by means of concentric shafts is well-known and illustrated and described in my said prior patents. The fifth drawing drum 5 receives the wire and is also provided for take-up in any well-known manner. Guide rollers for the wire are indicated at 14, 15 and 16.

In Fig. 4, the reference numeral 17 indicates a tubular outer shaft and 18 is a central inner shaft, disposed coaxially within the outer shaft. Said two concentric shafts 17, 18 are the two output shafts of the second differential gear 7 and the connection of said shafts with said differential gear may be performed substantially in the same way as illustrated and described in my said prior patents. The central shaft 18 has a disk-shaped shoulder 18' on its top end, a circular plate 19 being bolted to said shoulder. On said plate 19 the third drawing drum 3 is formed. The tubular shaft 17 has a disk-shaped shoulder 17' on its top end, a sleeve 20 being bolted to the underside of said shoulder. On the lower section of said sleeve 20 is the second drawing drum 2 formed. The first drawing drum 1 is bolted to the underside of the drawing drum 2. The tubular shaft 17 is through the sliding bearing 22 and the ball or roller bearing 23 mounted for rotation in the stationary bearing bush or sleeve 21, firmly supported by the frame of the machine. Said sleeve 21 has at its lower end a piece of connection 24 for a conduit for supplying lubricating oil, and at its top end a piece of distribution 25 for the lubricating oil supplied. Moreover, the reference numerals 26, 27, 28, 29, 30 indicates ring-shaped or sleeve-shaped shields.

In the plate 19 of the third drawing drum 3 there is rotatably mounted a vertical pin 31 having a handle 32 on its top end. On its lower end said pin supports a ring 33 having a lateral blocking tooth 34. By rotation of the handle 32 said tooth can be brought into (and out of) engagement with a toothed ring or rim 35 concentric with the shafts 17, 18 and attached to the shoulder 17'. By the aid of these means the three drawing drums 1, 2, 3 can be locked mutually when the wire is to be introduced in the machine before starting the wire-drawing operation. When introducing the wire in the machine the wire is laid a few turns around the drawing drums.

For illustrative purposes I want to mention that in one machine built in accordance with Figs. 2, 3 and 4, the diameters of the drawing drums 1, 2, 3, 4 and 5 were, respectively, 375 millimeters, 500 millimeters, 660 millimeters, 440 millimeters, and 560 millimeters. The first differential gear 6 had a gear ratio of 16:41; the second differential gear 7 had a gear ratio of 6:41; the third differential gear 8 had a gear ratio of 12:41. Moreover, it might be assumed that the input shaft 9 is operated with about 2000 revolutions per minute.

For drawing a wire having a diameter of 5.5 millimeters, for example, to a diameter of 2.60 millimeters, the degree of reduction in the individual dies of the series of dies could be 33% in the first die, 25% in the second die, 28.5% in the third die, 23% in the fourth die, and 20% in the fifth die, making a total of 77.5%. The first pass has to be the hardest one and the last pass has to be the lightest one. The second pass should correspond to the difference between the diameters of the first two interconnected drums, this difference being 125 millimeters which is 25% of 500 millimeters. Through said reduction degrees the wire is reduced to 4.50 millimeters in the first stage or pass, to 3.90 millimeters in the second stage, 3.30 millimeters in the third stage, 2.90 millimeters in the fourth stage, and 2.60 millimeters in the fifth stage. Then, the number of revolutions of the drawing drums would be 101 rev./min. for the first drum, 101 rev./min. for the second drum, 107 rev./min. for the third drum, 209 rev./min. for the fourth drum, and 204 rev./min. for the fifth drum.

It should be understood that said first differential gear 6 is asymmetrically loaded because more power is consumed in drawing the wire from 5.50 to 3.30 millimeters than from 3.30 to 2.60 millimeters and that said second differential gear 7 is asymmetrically loaded because more power is consumed in drawing the wire from 5.50 to 3.90 millimeters than from 3.90 to 3.30 millimeters. This asymmetrical loading is a result of the asymmetrical distribution of the number of drawing stages with respect to the first and second differential gears 6 and 7, causing a suitable "back-tension" between stages 2 and 3 and between stages 3 and 4 without braking, and allowing the selection of reduction degrees as most proper in view of the wire-drawing operation and the utilization of the wire-drawing capacity of the machine. Also the third differential gear 8 is asymmetrically loaded because more power is consumed in drawing the wire from 3.30 to 2.90 millimeters than from 2.90 to 2.60 millimeters.

In the method of drawing a wire in the five-stage machine described above the wire is of course drawn through all of the dies of the series of dies provided, but it is also possible to use said machine as a three-stage machine. In such a method of drawing wire it is essential to select for use such drawing stages that a more heavy load is obtained on the entrance side than on the take-up side. Thus, the wire should be drawn only through the second, third and fourth dies for loading the first differential gear 6 more heavily on one side by the second and third dies than on the other side by the fourth die. The fifth drum should be used only for take-up, thus not for drawing through its associated die. Of course, also in this case the highest degree of reduction should be in the first stage as used, viz. in the stage 2 according to the numbers used for the five-stage machine. For example the degrees of reduction in the first stage 2 could be 30%, while 25% and 20% are used in the second stage 3 and in the third stage 4.

As illustrated in Fig. 5, the principal features of the invention can be realized also in a wire-drawing machine built with less than five drawing stages, preferably only with three drawing stages, viz. three drawing drums and three associated dies. According to this alternative embodiment one single differential gear 6 is provided, operated by an input shaft 9 driven with a suitable speed. One of the two output shafts of said differential gear is provided for driving the first two drawing drums 1, 2 which are firmly interconnected, as already described, and the other of said two output shafts is provided for driving the third drawing drum 3 which is also the receiving and take-up drum.

The invention is not restricted to the embodiments described above and illustrated in the drawings, various modifications being possible without departing from the scope of the invention as defined in the following claims.

I claim:

1. A wire-drawing machine, comprising, a series of dies and at least three associated driven drums for drawing a wire through said series of dies, and a differential gear having one driving input shaft and two driven output shafts, said output shafts being provided as driving shafts for said drums, said differential gear being provided for driving a greater number of drums on one side than on the other, said greater number of drums including the second drum of said series of drums, the first two drums of said series of drums being interconnected to each other and to one of said two output shafts for joint operation by said one of said two output shafts, the third drum being connected to the other of said output shafts, the dimensions of said drums being so coordinated that said differential gear is more heavily loaded on one side than on the other.

2. A wire-drawing machine, comprising, a series of dies and a series of associated driven driven drums for drawing a wire through said series of dies, a first differential gear having a driving input shaft and two driven output shafts, a second differential gear having a driving input shaft constituted by one of said two output shafts of said first differential gear and having two output shafts, the first two drums of said series of drums being interconnected for joint operation by one of said two output shafts of said second differential gear, and the third drum of said series of drums being provided for operation by the other of said two output shafts of said second differential gears, and a third differential gear having a driving input shaft constituted by the other of said two output shafts of said first differential gear and having two output shafts provided as driving shafts for the remaining drums of said series of drums.

3. A wire-drawing machine, comprising, a series of dies and a series of associated driven drums for drawing a wire through said series of dies, a first differential gear having a driving input shaft and two driven output shafts, a second differential gear having a driving input shaft constituted by one of said two output shafts of said first differential gear and having two output shafts which are disposed concentrically, one within the other, the first two drums of said series of drums being mutually concentric and supported by one of said two output shafts of said second differential gear for joint operation by said one output shaft, and the third drum of said series of drums being concentric with said two first two drums and supported by the other of said two output shafts for operation by said other output shaft, and a third differential gear having a driving input shaft constituted by the other of said two output shafts of said first differential gear and having two output shafts which are disposed concentrically, one within the other, the fourth and fifth drums of said series of drums being mutually concentric and supported by a respective one of said two concentric output shafts of said third differential gear.

4. A wire drawing machine comprising in combination a series of dies and a series of associated driven drums for drawing a wire through said series of dies, a first differential gear having a driving input shaft and two driven output shafts, a second differential gear having a driving input shaft consisting of one of said two output shafts of said first differential gear and having two output shafts which are disposed concentrically one within the other, the first two drums of said series of drums being mutually concentric and supported by the outer of said two output shafts of said second differential gear for joint operation thereby, and the third drum of said series of drums being concentric with said first two drums and supported by the inner of said two output shafts for operation thereby, and a third differential gear having a driving input shaft consisting of the other of said two output shafts of said first differential gear and having two output shafts which are disposed concentrically one within the other, the fourth and fifth drums of said series of drums being mutually concentric and supported by a respective one of said two concentric output shafts of said third differential gear, the first drum of the said series being supported by the lower side of the second drum and joined to the top of said outer shaft, the third drum of said series joined to the top end portion of said inner shaft.

References Cited in the file of this patent

UNITED STATES PATENTS

| | | |
|---|---|---|
| 1,350,194 | Wiegins | Aug. 17, 1920 |
| 1,653,097 | Hodgson | Dec. 20, 1927 |
| 2,336,911 | Zimmerman | Dec. 14, 1943 |
| 2,699,864 | Hitchcock et al. | Jan. 18, 1955 |

FOREIGN PATENTS

| | | |
|---|---|---|
| 268,598 | Switzerland | Sept. 16, 1950 |
| 440,687 | Italy | Oct. 16, 1948 |